(12) United States Patent
Min

(10) Patent No.: US 9,131,268 B2
(45) Date of Patent: Sep. 8, 2015

(54) DISPLAY DEVICE, DISPLAY METHOD, AND MULTIMEDIA TRANSMISSION METHOD

(75) Inventor: Kyungyoon Min, Seoul, KS (US)

(73) Assignee: LG Electronics Inc., Seoul (KR)

( * ) Notice: Subject to any disclaimer, the term of this patent is extended or adjusted under 35 U.S.C. 154(b) by 116 days.

(21) Appl. No.: 13/643,734

(22) PCT Filed: Sep. 28, 2011

(86) PCT No.: PCT/KR2011/007167
§ 371 (c)(1),
(2), (4) Date: Oct. 26, 2012

(87) PCT Pub. No.: WO2012/044078
PCT Pub. Date: Apr. 5, 2012

(65) Prior Publication Data
US 2013/0038508 A1 Feb. 14, 2013

(30) Foreign Application Priority Data
Sep. 28, 2010 (KR) ........................ 10-2010-0093564

(51) Int. Cl.
| G06F 3/038 | (2013.01) |
| G09G 5/00 | (2006.01) |
| H04N 21/4363 | (2011.01) |
(Continued)

(52) U.S. Cl.
CPC ........ *H04N 21/43635* (2013.01); *G06F 3/1446* (2013.01); *G09G 5/006* (2013.01); *H04N 5/765* (2013.01); *G09G 2358/00* (2013.01);
(Continued)

(58) Field of Classification Search
CPC . H04N 21/43635; H04N 5/765; H04N 21/00; G09G 2370/04; G09G 2370/12; G09G 5/006; G09G 2370/10; G09G 2358/00; G06F 3/1446

USPC ........ 345/1.1, 1.2, 2.1, 2.3, 554, 723, E3.049, 345/E5.093; 348/554, 723, E3.049, E5.093
See application file for complete search history.

(56) References Cited

U.S. PATENT DOCUMENTS

2007/0055876 A1* 3/2007 Choi ........................... 713/170
2008/0172501 A1* 7/2008 Goodart et al. ................. 710/33
(Continued)

FOREIGN PATENT DOCUMENTS

| CN | 1929580 A | 3/2007 |
| CN | 101364169 A | 2/2009 |
(Continued)

OTHER PUBLICATIONS

International Search Report issued in PCT Application No. PCT/KR11/007167 dated Apr. 20, 2012.
(Continued)

*Primary Examiner* — Alexander Eisen
*Assistant Examiner* — Abhishek Sarma
(74) *Attorney, Agent, or Firm* — KED & Associates LLP

(57) ABSTRACT

Provided are a display device configuring a multi-display and a display method. The multi-media display receives a DisplayPort signal from outside, converts the received signal into a set of LVTTL signals, converts a portion of the LVTTL signals into a high-quality image signal capable of using HDMI to display multimedia on a corresponding display device, and converts another portion of the LVTTL signals into a DisplayPort signal to transmit the DisplayPort signal to another display device. Accordingly, an infinite multi-display can display high quality multimedia.

9 Claims, 4 Drawing Sheets

(51) Int. Cl.
*H04N 5/765* (2006.01)
*G06F 3/14* (2006.01)

(52) U.S. Cl.
CPC ........ *G09G2370/04* (2013.01); *G09G 2370/10* (2013.01); *G09G 2370/12* (2013.01)

(56) References Cited

U.S. PATENT DOCUMENTS

| | | | |
|---|---|---|---|
| 2009/0196340 A1* | 8/2009 | Tsukada | 375/240.01 |
| 2009/0251605 A1* | 10/2009 | Hsiao | 348/554 |
| 2010/0328540 A1* | 12/2010 | Wu et al. | 348/723 |
| 2011/0134330 A1* | 6/2011 | Yu et al. | 348/705 |

FOREIGN PATENT DOCUMENTS

| | | |
|---|---|---|
| CN | 101416496 A | 4/2009 |
| JP | 07-203385 | 8/1995 |
| JP | 2006-81170 | 3/2006 |
| KR | 10-2008-0091451 A | 10/2008 |
| WO | WO 2010090597 A1 * | 8/2010 |

OTHER PUBLICATIONS

Chinese Office Action and Search Report for Application 2011800327893 dated Jan. 16, 2015.

* cited by examiner

DISPLAY DEVICE, DISPLAY METHOD, AND MULTIMEDIA TRANSMISSION METHOD

BACKGROUND ART

The present disclosure relates to a multimedia transmission and display method of a multi-display, and more particularly, to a display device and a display method, which prevent image quality for high-quality multimedia data from being damaged and realize infinite multi-screen connection by using a DisplayPort for interconnection between display devices configuring the multi-display and connection between respective displays.

With the advance of multimedia technologies, recently, display devices include Unified Digital Interface (UDI), High Definition Multimedia Interface (HDMI), and Digital Visual Interface (DVI) terminals for transmission and reception of multimedia data. Authentication in accordance with High-Bandwidth Digital Content Protection (HDCP) standard is required for encrypting a path through which digital signals are transmitted and received, in the interface. Therefore, even when high-quality multimedia is transmitted, deterioration of image quality inevitably occurs in a display device including no HDCP terminal.

Moreover, as it becomes possible to create high quality multimedia data, the high image qualities and enlargements of displays are required, and demand of a multi-display type display device including a plurality of displays connected therebetween is increasing. FIG. 1 illustrates an example of a multi-display 100 including four displays connected therebetween.

Referring to FIG. 1, first to fourth displays are connected in the order of the first to fourth displays in a daisy chain scheme. In this case, in an operation where high-quality multimedia data received by the first display is transmitted to the fourth display, a signal is deteriorated by passing through a cable and a module internal to the display.

Referring to FIG. 2, moreover, an analog-type input signal RGBHV passes through an operational amplifier (OP-AMP) and Schmitt trigger and thus synchronization damage is compensated, in the first display 50. In this case, an analog signal is deteriorated by an RGB cable of the display 50 or Printed Circuit Board (PCB)-capacity component to degrade image quality, and the number of displays connected to a daisy chain is limited. Also, image quality is degraded whenever multimedia data that is received in the HDCP standard passes through a plurality of displays, and therefore, when multimedia data passes through seven to eight displays, image quality is severely degraded and thus it becomes impossible to increase the number of displays.

When multimedia is transmitted with HDMI, royalty is paid for each device, and thus in the case of the multi-display where royalty is paid per a plurality of displays, cost burden increases.

DISCLOSURE OF INVENTION

Technical Problem

Reference will now be made in detail to the embodiments of the present disclosure, examples of which are illustrated in the accompanying drawings. In this case, the configuration and operation of the present disclosure, which are illustrated in the drawings and are described with reference to the drawings, are described as at least one embodiment. The technical spirit and essential configuration of the present disclosure are not limited to thereto.

In the specification, for the terms used in the present disclosure, general terms widely currently used have been selected as possible as they can. However, this may be changed according to the intention or custom of a technician working in the art or the advent of new technology. In a specific case, moreover, terms arbitrarily selected by an applicant may be used.

In this case, since the meaning thereof is described in detail in the detailed description of the specification, the present disclosure should be understood in an aspect of meaning of such terms, not the simple names of such terms.

FIG. 3 is a block diagram illustrating a configuration of a video display device according to an embodiment.

Referring to FIG. 3, a video display device 10 may include a reception unit 11, a conversion unit 12, a control unit 13, a display unit 14, and a transmission unit 15.

A multi-display according to an embodiment may have a configuration where the display device 10 in FIG. 3 is connected in plurality in a daisy chain type. Also, connection between the display devices 10 and interconnection between modules of the display device 10 may be made in a DisplayPort scheme, which may use a DisplayPort 1.1a version or higher.

A DisplayPort is an example of a digital multimedia interface having a claimed transmission type according to an embodiment, and the scope of the present disclosure may also be included in another scheme based on a digital multimedia interface standard having another transmission type.

The DisplayPort is a standard of a digital display interface, and may transmit AC-coupled video/audio signal as a digital signal. Furthermore, the DisplayPort may transmit data over a frequency bandwidth of a high-bandwidth gigabyte unit, and aid high-resolution (2560*1600) image quality.

Moreover, since there is no royalty for use, economic burden is small compared to HDMI where data is encrypted and transmitted according to HCDP. Also, since an allowable length of a transmission cable is 3 m or longer, the DisplayPort is suitable for connection between displays of a multi-display that includes the displays.

Solution to Problem

The DisplayPort stably transmits data by using an auxiliary (AUX) channel that corrects a gain when a signal is deteriorated and thus always allows a constant signal to be provided.

Digital video and digital audio may be packetized based on extensible micro packets having a wide transmission frequency bandwidth and transmitted together, according to a data transmission protocol of the DisplayPort. Also, the DisplayPort is compatible with existing DVI or HDMI, and thus may be used even in a display including a scalier thereof. Since the DisplayPort aids HDCP, the DisplayPort is compatible with HDMI where data is encrypted according to HDCP.

The reception unit 11 may receive a DisplayPort signal inputted through a DisplayPort connector. Transfer from the connector to the reception unit 11 may be made through the auxiliary channel. The reception unit 11 may convert a DisplayPort signal into a Transistor-Transistor Logic (TTL) signal and output the converted signal. The TTL signal may be a LVTTL(Low Voltage Transistor-Transistor Logic) signal.

By recognizing an analog signal of 2V or higher as 1 and recognizing an analog signal 0.8V or less as 0, digital processing can be accurately performed in spite of signal deterioration due to noise. Herein, 1 and 0 are digital signals (swing level 3.3V) that are based on LVTTL format and robust to noise.

The TTL signal outputted from the reception unit 11 may include a set of TTL signals, for example, a 30 bit TTL-odd signal and a 30 bit TTL-even signal. A TTL-even signal may be an example of some signals among a set of claimed TTL signals according to an embodiment, and the TTL-odd signal may be a signal corresponding to some signals among a set of claimed TTL signals according to an embodiment, and vise versa.

The reception unit 11 may transmit a TTL-even signal to the conversion unit 12, and transmit a TTL-odd signal to the transmission unit 15. The reception unit 11 may be STDP4020 Integrated Chip (IC) that has been manufactured by Video Electronics Standard Association (VESA). An input terminal of the reception unit 11 may be configured with a DisplayPort connector, and an output terminal of the reception unit 11 may include one of a WQXGA quality
  image signal output terminal, a TTL/Low-Voltage Differential Signaling (LVDS) video output terminal, and I2S/SPDIF audio output terminal.

The conversion unit 12 may receive the TTL-even signal and convert the TTL-even signal into a high-quality image signal.

For example, the conversion unit 12 may be configured with a Transition Minimized Differential Signaling (TMDS) transmitter IC that may convert a TTL-even signal into a TMDS signal.

The high-quality image signal converted into the TMDS type may be transferred to the control unit 13 that controls the overall operation of the display device 10. The TTL-even signal may be converted by the conversion unit 12 and be transferred by an interface based on the existing HDMI scheme. Subsequent image processing is performed identically to the existing HDMI scheme.

The TTL-odd signal, which is another signal corresponding to the portion of the TTL signals, may be transferred to the transmission unit 15. The transmission unit 15 may again convert the TTL-odd signal into the DisplayPort signal, and thus allows the DisplayPort signal to be transmitted
  to the outside without signal deterioration.
  The control unit 13 may control the display unit 14 to
  display a high-quality multimedia image that is transferred in
  the HDMI type. Also, the control unit 13 may include a graphic
  card and a receiver for a TMDS signal.

The display unit 14 may convert an image signal, a data signal and an On-Screen Display (OSD) signal, which have been processed by the control unit 13, into RGB signals to generate a plurality of driving signals, respectively. Alternatively, the display unit 14 may convert an image signal, a data, etc., which have been received through an external device interface (not shown), into RGB signals to generate a plurality of driving signals, respectively. The display unit 14 may server as a Plasma Display Panel (PDP), a flexible display, and a Three-Dimensional (3D) display.

The display unit 14 may include a TMDS receiver, and receive a TMDS signal. The display unit 14 may scale the received TMDS signal in accordance with a necessary format, and output the scaled signal to a display panel.

The transmission unit 15 may be configured with STDP4028 IC that has been manufactured by VESA. An input terminal of the transmission unit 15 may be configured with a TTL/LVDS video input terminal or an I2S/SPDIF audio input
  terminal, and an output terminal of the transmission unit 15 may be configured with a WQXGA-quality image signal connector or a DisplayPort connector.

The display device 10 of FIG. 3 includes the display unit 14, but is not limited thereto. As another example, the display device 10 may include a set-top box having a broadcast receiving function without the display unit 14, and moreover, the display device 10 may include a network television (TV), a smartTV, a Hybrid Broadcast Broadband (HBB) TV, etc.

FIG. 4 is a block diagram illustrating in detail a configuration of the reception unit 11 according to an embodiment.

FIG. 5 is a block diagram illustrating in detail a configuration of the transmission unit 15 according to an embodiment.

Referring to FIG. 4, the reception unit 11 may include a receiver 111 that receives a DisplayPort signal received by a connector, an authenticator 112 that decodes the encrypted signal of high-bandwidth multimedia data, a format converter 113 that converts the DisplayPort signal into a 60 bit TTL signal, and an audio transmitter 114.

The receiver 111 may divide a packetized DisplayPort signal into a video signal and an audio signal. The receiver 111 may transfer the video signal to the format converter 113, and transfer the audio signal to the audio transmitter 114.

The authenticator 112 may store an encryption key for decrypting an encrypted DisplayPort signal, specifically, an HDCP encrypted DisplayPort signal. The authenticator 112 may transfer the encryption key to the receiver 111 to decrypt the encrypted DisplayPort signal.

An DisplayPort audio signal may be transferred to the conversion unit 13 and the transmission unit 15 through the audio transmitter 114. The audio transmitter 114 is implemented independently of the format converter 113 In FIG. 4, but may be included in the format converter 113.

The format converter 113 may convert a DisplayPort video signal into a 60 bit TTL signal. In this case, the 60 bit TTL signal may be divided into a 30 bit TTL-even signal and a 30 bit TTL-odd signal, which may be respectively transferred to the conversion unit 13 and the transmission unit 15.

As described above with reference to FIG. 4, the reception unit 11 according to an embodiment may convert the received DisplayPort signal into a set of TTL signals, specifically, a 60 bit TTL signal, transfer an even-LVTTL signal
  of the 60 bit TTL signal to the conversion unit 12 to convert the even-LVTTL signal into a TMDS signal capable of using HDMI, and thus may allow the TMDS signal to be inputted to a typical display device including a TMDS receiver and to be displayed. That is, as the reception unit 11 according to an embodiment is included in the typical display device, and thus it allows stable multimedia data (which is transmitted through a DisplayPort and
  robust to noise) to be displayed on the typical display device applying an interface based on the existing HDMI scheme without degrading of image quality.

Referring to FIG. 5, the transmission unit 15 according to an embodiment may include a receiver 151, a format converter 152, a transmitter 153, and an audio receiver 154.

The 30 bit odd-LVTTL signal may be received through the receiver 151, and an audio signal may be received by the audio receiver 154. The audio receiver 154 may be included in the receiver 151. The format converter 152 may convert the 30 bit odd-LVTTL signal and audio signal into a DisplayPort signal.

That is, the 30 bit odd-LVTTL signal and the audio signal may be packetized into a DisplayPort video signal and a DisplayPort audio signal, which may be transmitted by the transmitter 153.

The transmitter 153 may include an authenticator (not shown) that may encrypt a DisplayPort signal. For example, the transmitter 153 may transmit a DisplayPort signal that has been encrypted according to HDCP.

As described above with reference to FIG. 5, the transmission unit 15 according to an embodiment again converts data, which has been converted into a TTL signal in the display device 10, into a DisplayPort signal for transmitting the data to another display device. Therefore, each of a plurality of display devices may receive/transmit digital multimedia through DisplayPort. Also, since digital multimedia is transmitted by an LVTTL scheme or a DisplayPort where deterioration due to noise does not occur, although a plurality of display devices are connected, signal deterioration due to a connection path can be prevented. Moreover, when data is transmitted from one display device to another display device, since the data is encrypted according to HDCP and HDCP authentication is performed by a reception unit of the other display device receiving the data, there is no limitation in HDCP authentication even in a case of connecting a plurality of display devices. Accordingly, a multidisplay including infinite display devices connected therebetween may be manufactured.

FIG. 6 illustrates a multi-display including display devices connected therebetween, according to an embodiment.

Referring to FIG. 6, as a DisplayPort signal is inputted from a source 200 to a first display 10 through an auxiliary channel of a DisplayPort interface, authentication is performed between the source 200 and the first display 10.

Specifically, HDCP authentication is performed between a DisplayPort transmitter (Tx) of the source 200 and the reception unit 11 of the first display 10. The authenticated DisplayPort signal as High Definition (HD) multimedia can be displayed on the first display 10 as passing through the reception unit 11 and the conversion unit 12.

Next, as a DisplayPort signal outputted from the transmission unit 15 of the first display 10 is inputted to a second display 20 through an auxiliary channel, authentication is performed between the first display 10 and reception unit (Rx) of second displays 20. Subsequent transmission and authentication from the second display 20 to a third display 30 and from the third display 30 to a fourth display 40 are identical to transmission and authentication from the first display 10 to the second display 20.

As illustrated in FIG. 6, since authentication of multimedia video data, for example, HDCP authentication is performed in a reception unit of each display configuring a multi-display, a high-quality multimedia state can be maintained independent of signal deterioration even when the data passes through a plurality of displays. That is, an infinite multi-display for outputting a high-quality image may be manufactured.

FIG. 7 is a flowchart illustrating a digital multimedia display method using one display device included in a multi-display, according to an embodiment.

In operation S11, the display device receives a digital multimedia signal of transmission type from the outside.

Specifically, the display device receives a DisplayPort signal from a DisplayPort source or another display device. Herein, the DisplayPort signal may be transmitted through an auxiliary channel.

In operation S12, the display device authenticates the received digital multimedia signal of transmission type. In detail, since the DisplayPort signal received by a DisplayPort interface is compatible with HDCP, HDCP authentication is performed in a reception unit of the display device. Also, the display device may divide the authenticated DisplayPort signal into a video signal and an audio signal.

In operation S13, the display device converts the authenticated DisplayPort signal into a set of TTL signals.

Specifically, the authenticated DisplayPort signal is converted into the set of TTL signals including a 30 bit odd-LVTTL signal and a 30 bit even-LVTTL signal.

In operation S14, the display device converts some of the set of TTL signals into high-quality image signals. For example, the display device converts a 30 bit even-LVTTL signal into a TMDS signal capable of using HDMI.

In operation S15, the converted high-quality image signal is transferred to a display unit. For example, the converted TMDS signal is transferred to a display unit that includes a video card having an HDMI input terminal. Transfer to the display unit may be performed by a control unit that controls the overall operation of the display device.

In operation S16, the display unit displays a high quality image.

FIG. 8 is a flowchart illustrating a digital multimedia transmission method of a display device included in a multi-display, according to an embodiment.

In operation S21, the display device receives a digital multimedia signal of transmission type from the outside. Specifically, the display device receives a DisplayPort signal from a DisplayPort source or another display device. Herein, the DisplayPort signal may be transmitted through an auxiliary channel.

In operation S22, the display device authenticates the received digital multimedia signal of transmission type. In detail, since the DisplayPort signal received by a DisplayPort interface is compatible with HDCP, HDCP authentication is performed in a reception unit of the display device. Also, the display device may divide the authenticated DisplayPort signal into a video signal and an audio signal.

In operation S23, the display device converts the authenticated DisplayPort signal of transmission type into a set of TTL signals. Specifically, the authenticated DisplayPort signal is converted into the set of TTL signals including a 30 bit odd-LVTTL signal and a 30 bit even-LVTTL signal.

In operation S24, the display device converts a signal, corresponding to a portion of the set of TTL signals, into the authenticated DisplayPort of transmission type signal. For example, the display device again converts the 30 bit odd-LVTTL signal into a DisplayPort signal. At this point, the display device may packetize a video DisplayPort signal and an audio DisplayPort signal, and perform an HDCP encryption operation.

In operation S25, the display device transmits the digital multimedia signals of transmission type to another display device. For example, the display device transmits a DisplayPort signal to the other display device.

When a corresponding display device is the final display device forming a chain, operation S25 may be omitted.

As described above, the video display device and method according to an embodiment transmit and display multimedia data without signal deterioration even when infinite display devices configure a multi-display. Moreover, since royalty is paid because of transmission and authentication based on the DisplayPort scheme, the cost is saved. Also, just mounting the reception unit 11 for receiving the DisplayPort signal and the transmission unit 15 for transmitting the DisplayPort signal on each display device can implement an infinite multi-display, and thus multimedia can be simply realized at low cost.

In the embodiment, the display device and method according to an embodiment have been described above, but the disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

Figure 1:
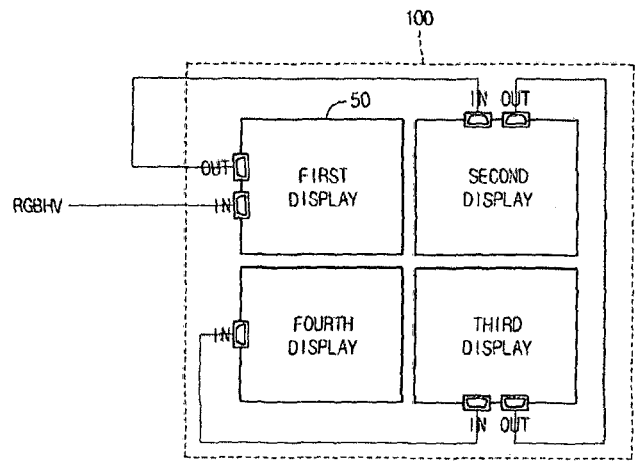
FIG. 1 is a block diagram illustrating a configuration of a multi-display.
Figure 2:
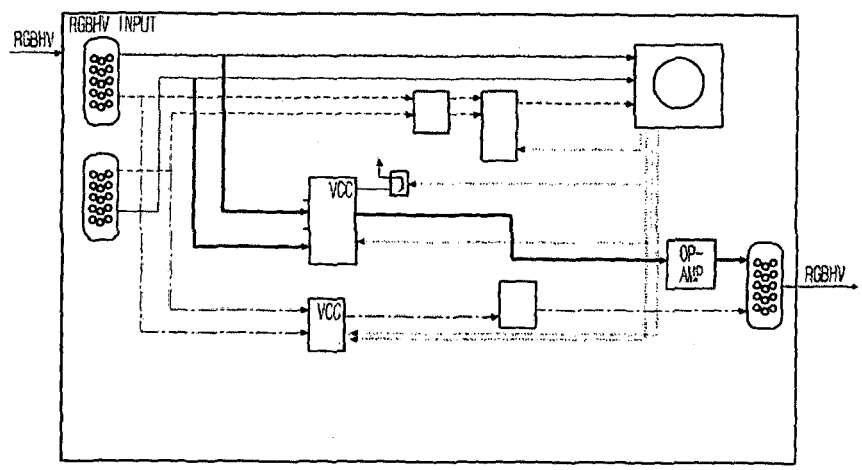
FIG. 2 is a circuit diagram illustrating a multidisplay.
Figure 3:
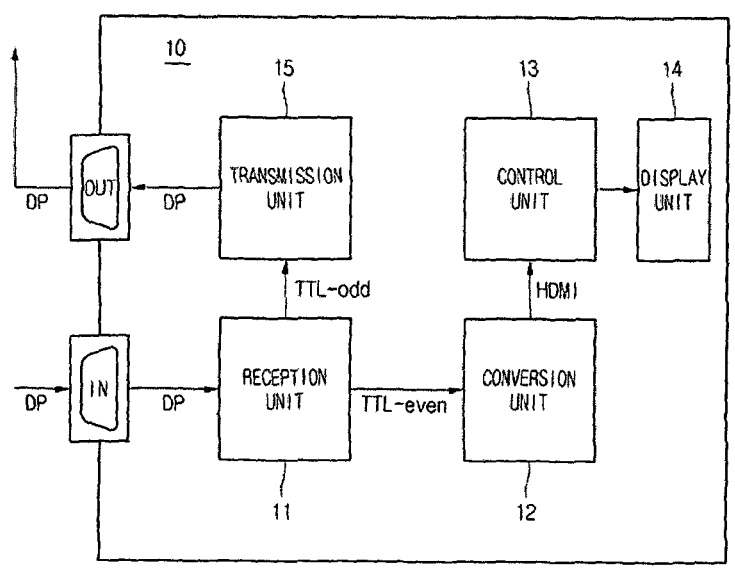
FIG. 3 is a block diagram illustrating a configuration of a display configuring a multi-display according to an embodiment.
Figure 4:
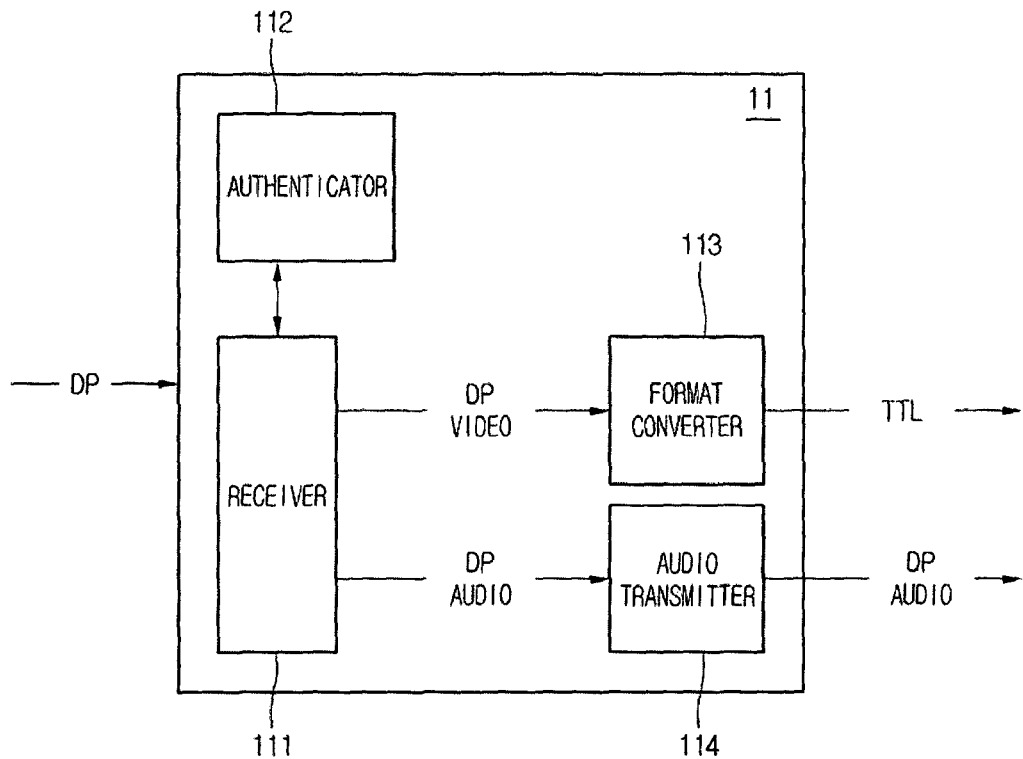
FIGS. 4 and 5 are block diagrams illustrating a receiver and a transmitter internal to a display according to an embodiment.
Figure 5:
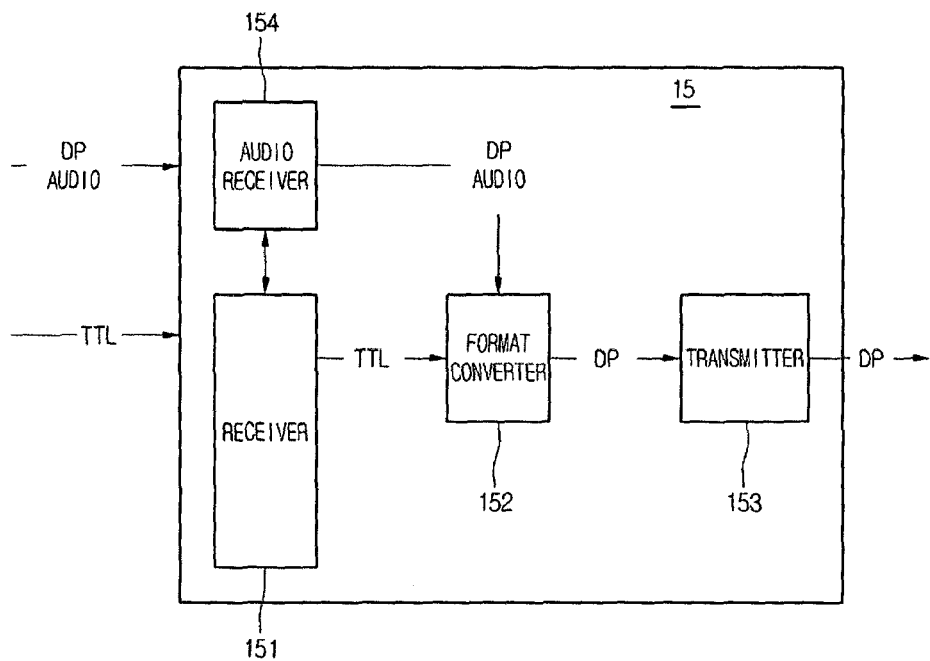
Figure 6:
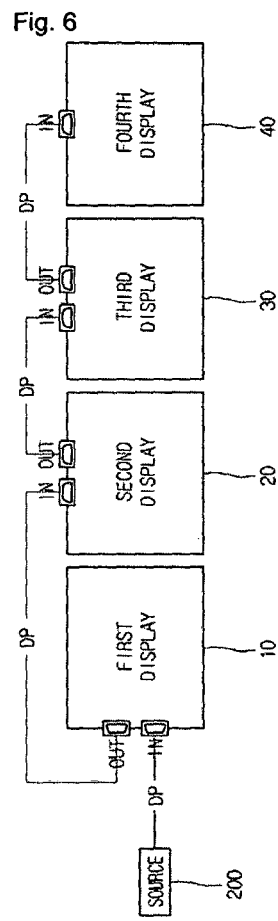
FIG. 6 is a diagram illustrating a multi-display which includes a plurality of displays connected therebetween, according to an embodiment.
Figure 7:
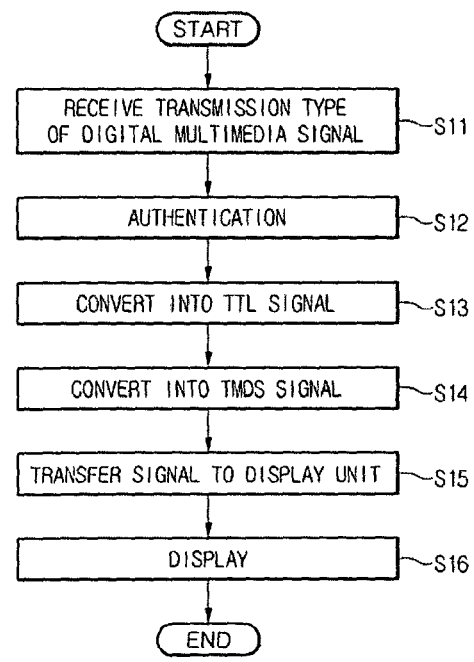
FIG. 7 is a flowchart illustrating a display method according to an embodiment.
Figure 8:
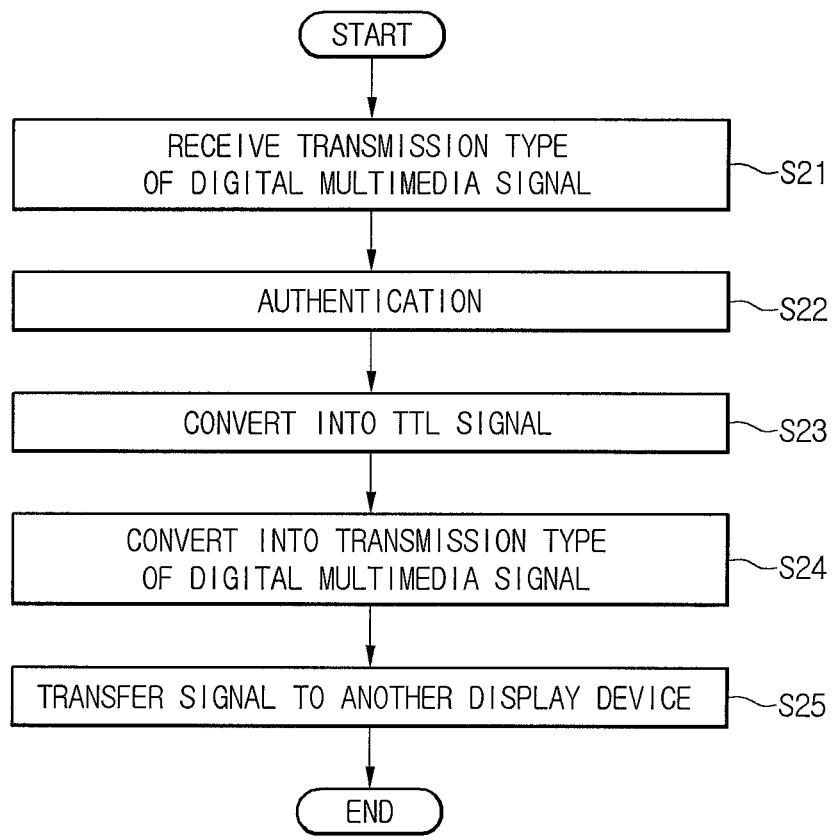
FIG. 8 is a flowchart illustrating a multimedia transmission method according to an embodiment.

Embodiments provide a display device, a display method, and a multimedia transmission method, which connect a plurality of displays configuring a multi-display in a DisplayPort scheme and thus display high-quality multimedia without degrading of image quality, in displaying high-quality multimedia on the multi-display.

Embodiments also provide a display device, a display method, and a multimedia transmission method, which perform interconnection internal to each display configuring a multidisplay by using a DisplayPort, changes a DisplayPort signal to a Low Voltage Transistor-Transistor Logic (LVTTL) signal to perform interconnection, thereby reducing a noise rate and saving consumption power.

Embodiments also provide a display device which changes LVTTL-changed multimedia to high-quality multimedia to display the high-quality multimedia, and thus is compatible with a display device based on an HDMI-type interface.

Embodiments also provide a display device, a display method, and a multimedia transmission method, which passes HDCP authentication each time multimedia is transmitted/received between a plurality of displays configuring a multi-display, and thus maintains the original high-quality multimedia even when multimedia pass passes the displays, thereby enabling the manufacture of a large multi-display including infinite displays.

In one embodiment, a display device among at least one or more display devices which are connected through an interface of digital multimedia and configures a multi-display includes: a reception unit receiving a digital multimedia signal of transmission type from outside, and converting the received multimedia signal into a set of Transistor-Transistor Logic (TTL)

signals; a conversion unit receiving a portion of the set of TTL signals to convert the received signal into a high-quality image signal; a transmission unit converting a signal corresponding to a portion of the set of TTL signals into a signal based on the interface of digital multimedia scheme, and transmitting the converted signal to another display device; and a control unit controlling display of the converted high-quality image signal.

In another embodiment, a display method of a multidisplay which is connected through interface of digital multimedia includes: receiving a digital multimedia signal of transmission type from outside; authenticating the received digital multimedia signal of transmission type; converting the authenticated signal into a set of TTL signals; converting a portion of the converted TTL signals into a high-quality image signal; and transmitting the high-quality image signal to a display unit to display the high-quality image signal.

In further another embodiment, a multimedia transmission method of a multi-display which is connected through a DisplayPort interface includes: receiving a digital multimedia signal of transmission type from outside; authenticating received the digital multimedia signal of transmission type; converting the authenticated signal into a set of TTL signals; converting a signal corresponding to a portion of the set of TTL signals into a signal based on a interface of digital multimedia scheme; and transmitting the converted signal based on the interface of digital multimedia scheme to another display device.

The details of one or more embodiments are set forth in the accompanying drawings and the description below. Other features will be apparent from the description and drawings, and from the claims.

The invention claimed is:

1. A display device among at least one or more display devices that are connected through an interface of digital multimedia and configured as a multi-display, the display device comprising:
a first reception unit configured to receive a first DisplayPort signal from a first transmission unit of a previous display device by a first aux channel, decrypt the first DisplayPort signal, wherein the first DisplayPort signal is encrypted based on High-Bandwidth Digital Content Protection (HDCP) by the previous display device, divide the first DisplayPort signal into a digital video signal and a digital audio signal, and convert the digital video signal into a first Transistor-Transistor Logic (TTL) signal and a second Transistor-Transistor Logic (TTL) signal;
a conversion unit configured to convert the first TTL signal into a high-quality image signal;
a display unit configured to display the high-quality image signal; and
a transmission unit configured to receive the second TTL signal, convert the second TTL signal and the digital audio signal into a second DisplayPort signal, encrypt the second DisplayPort signal based on HDCP, and transmit the encrypted second DisplayPort signal to a next display device by a second aux channel,
wherein the second DisplayPort signal is received and decrypted by the next display device, wherein the first and second aux channel corrects a gain when the first DisplayPort signal is deteriorated, wherein the first TTL signal is displayed by being converted into the high-quality image signal at the display device, and wherein the second TTL signal is transmitted to the next display device by being converted into the second DisplayPort signal, to display a high-quality image signal at the next display device.

2. The display device according to claim 1, wherein each of the first TTL signal and the second TTL signal is a Low Voltage Transistor-Transistor Logic (LVTTL) signal.

3. The display device according to claim 1, wherein the conversion unit converts the first TTL signal into a Transition Minimized Differential Signaling (TMDS) signal that is used in High Definition Multimedia Interface (HDMI).

4. The display device according to claim 1, wherein the previous display device includes one of a broadcast receiver, a multimedia storage apparatus, a set-top box, and another display device.

5. The display device according to claim 2, wherein the Low Voltage Transistor-Transistor Logic (LVTTL) signal recognizes signal of 2V or higher as 1 and recognizes signal of 0.8V or less as 0.

6. A method of displaying a display device, the display method comprising:

receiving a first DisplayPort signal from a first transmission unit of a previous display device by a first aux channel, the first DisplayPort signal being encrypted based on High-Bandwidth Digital Content Protection (HDCP) by the previous display device;

decrypting the encrypted first DisplayPort signal;

dividing the decrypted first DisplayPort signal into a digital video signal and a digital audio signal;

converting the digital video signal into a first Transistor-Transistor Logic (TTL) signal and a second Transistor-Transistor Logic (TTL) signal;

converting the first TTL signal into a high-quality image signal;

displaying the high-quality image signal;

converting the second TTL signal and the digital audio signal into a second DisplayPort signal;

encrypting the second DisplayPort signal based on HDCP; and transmitting the encrypted second DisplayPort signal to a next display device by a second aux channel, wherein the second DisplayPort signal is received and decrypted by the next display device, wherein the first and second aux channel corrects a gain when the first DisplayPort signal is deteriorated, wherein the first TTL signal is displayed by being converted into the high-quality image signal at the display device, and wherein the second TTL signal is transmitted to the next display device by being converted into the second DisplayPort signal, to display a high-quality image signal at the next display device.

7. The display method according to claim 6, wherein each of the first TTL signal and the second TTL signal is a Low Voltage Transistor-Transistor Logic (LVTTL) signal.

8. The display method according to claim 6, wherein the converting comprises converting the first TTL signal into a Transition Minimized Differential Signaling (TMDS) signal that is used in High Definition Multimedia Interface (HDMI).

9. The display method according to claim 7, wherein the Low Voltage Transistor-Transistor Logic (LVTTL) signal recognizes signal of 2V or higher as 1 and recognizes signal of 0.8V or less as 0.

* * * * *